United States Statutory Invention Registration [19]

[11] Reg. Number: H592

Gillum

[43] Published: Mar. 7, 1989

[54] SHELL FEEDER FOR TELESCOPED AMMUNITION

[75] Inventor: Richard R. Gillum, Marblehead, Ohio

[73] Assignee: The United States of America as represented by the Secretary of the Navy, Washington, D.C.

[21] Appl. No.: 221,051

[22] Filed: Jul. 15, 1988

[51] Int. Cl.[4] ..... F41F 9/06

[52] U.S. Cl. ..... 89/46; 89/33.05; 89/35.01

*Primary Examiner*—Stephen C. Bentley

*Attorney, Agent, or Firm*—John D. Lewis; Kenneth E. Walden

[57] ABSTRACT

A shell feeding system comprising an endless loop, nondisintegrating link belt 14 within a magazine 12 for moving telescoped shells into an extraction position where they are side stripped and transferred to a ram load position. A hydraulic cylinder 48 is used to incrementally index belt 14 placing a round into position. Another hydraulic cylinder 76 accomplishes the transfer of an extracted shell 16' to the cannon load position.

15 Claims, 4 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

SHELL FEEDER FOR TELESCOPED AMMUNITION

The invention described herein may be manufactured and used by and for the United States of America for governmental purposes without the payment of any royalties thereon or therefor.

BACKGROUND OF THE INVENTION

This invention is within the munitions art and concerns a device for automatically feeding ammunition to a cannon. More particularly, a device to deliver the new telescoped ammunition to a rapid fire cannon is disclosed in the form of a nondisintegrating ammunition conveyor belt.

Rapid-fire, medium calibre cannon are important in antiarmor and antiaircraft roles. These weapons require a shell supply-system that can supply a relatively large number of shells to the cannon without magazine reloading. The prior art contains references to shell conveyor belts for conventional ammunition. For example, U.S. Pat. No. 3,026,776 to N. D. KINTZER discloses a cartridge belt which releasably retains the cartridges so that they can be side stripped in a manner permitting a high cyclic rate of fire. U.S. Pat. No. 4,044,649 to WILDER also discloses a shell feeder which comprises a series of sprockets with half-circle cutouts that progressively move ammunition from a belt drive to a ram load position. Both KINTZER and WILDER are designed to handle conventional ammunition delivered to a horizontal ram to breach load a conventional cannon.

No prior art was located teaching a system designed to shell feed the new "perfect cylinder" telescoped ammunition, such as that used with the Navy's new concept, 75 mm rapid fire cannon.

Cannon firing telescoped ammunition, in which the projectile is fully contained in the shell casing, offers several advantages over conventional guns for military roles. Telescoped shells, which although somewhat larger in diameter, are much shorter in length than conventional shells of comparable calibre. The new shells offer several advantages over conventional ammunition. The advantages include a short shell feed path for the guns ram-loader and a higher shell packing density for the ammunition magazine. The uniform cylindrical shape of telescoped shells coupled with their relative shortness, when compared to conventional ammunition, provides packing and storage economies through the logistics chain. Also, because of the relative shortness of the new shells, they can be stored upright in the cannon's magazine without causing undesirably high weapons system silhouette.

The shift in the munitions art from conventional cannons to those firing the telescoped ammunition require that new cannons be developed. One such cannon is the Navy's rotating chamber, 75 mm, rapid-fire assault cannon. This cannon has a cyclic rate of fire of 50 rounds per minute. New shell magazines specifically adapted to store and feed telescoped shells must also be developed. These shell feeding systems are required to feed shells vertically into a chamber that then rotates 90 degrees to horizontal alignment with the cannon breach for firing.

The disclosure herein is a device for shell feeding the new telescoped shells used in the new cannons.

SUMMARY OF THE INVENTION

An object of the invention is to provide a shell feeding device capable of conveying telescoped ammunition to a cannon ram loader.

Another object of the present invention is to teach a device capable of delivering telescoped shells to a rapid fire cannon with a high cyclic rate of fire.

Still another object of the present invention is to provide a shell feeder that can deliver telescopic shells upright to a vertical ram loader for use in the new rotating chamber cannons.

These and other advantages and objects are obtained by the instant invention wherein a magazine is loaded with telescoped ammunition releasably locked into a pair of nondisintegrating endless chains of links designed to entrain the cylindrical ammunition between the links and form a conveyor belt. The conveyor belt moves the rounds to a preselected point. At the preselected point the chain loops back on itself releasing the ammunition in the process. A transfer assembly grasps the newly released ammunition and transports it to a load position where a ram loader (not shown), loads the telescoped shell into a cannon. A mechanical timing advances the chain of ammunition with each cyclic of the transfer assembly, thus providing a rapid fire shell feeding device.

Other and further features, objects, advantages and benefits of the invention will become apparent from the following description taken in conjunction with the following drawings. It is to be understood that both the foregoing description and the following detailed description are exemplary and explanatory, but are not restrictive of the invention. The accompanying drawings, which are incorporated in and constitute a part of this invention, illustrate some of the embodiments of the invention. These, together with the description, serve to explain the principles of the invention in general terms.

It should be understood that the drawings are not necessarily to scale and that the embodiment is not depicted in its finished commercial configuration. For example, the shell feeder in a workable field embodiment will be used in conjunction with a rammer to ram the ammunition into the cannon. Embodiments will be required that have the capability to feed cannon using a horizontal ram and those, like the new Navy 75 mm, which ram the ammunition vertically up into a rotating chamber. Details which are not necessary to an understanding of the present invention or which may render other details difficult to perceive have been omitted when it is old and known in the art how to make and use the omitted structure and details. For example, an exact detailed schematic of the hydraulic system is not disclosed as these features are standard and known to those skilled in the art. Accordingly, it is to be understood that the invention may be practiced other than that depicted in the embodiment illustrated herein. The preferred embodiment of the invention will now be described in detail with reference to the drawings.

DETAILED DESCRIPTION

Figure 1:
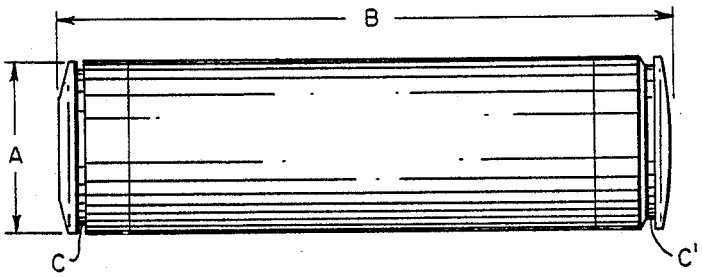
FIG. 1 is a plain view of the new telescoped ammunition.

Referring now to the drawings, first to FIG. 1, wherein a plain view of the new telescoped ammunition may be viewed. The ammunition depicted in FIG. 1 and described with dimensions is a 75 mm cartridge for use in the new Navy 75 mm assault cannon. The ammunition is best described as cylindrical with slightly rounded ends. In the 75 mm cartridge of FIG. 1, the diameter A is 5.125 inches. The length B is 19 inches. The weight of each round varies with type between 35 and 40 pounds. The case contains containment grooves C and C′ approximately one-fourth of an inch in depth and width circumscribing both ends of the ammunition approximately one-half inch from the ends. A measurement from the center of groove C′ to the center of groove C, in 75 mm ammunition, is 18 inches. Containment groove C on the rear of the telescoped ammunition also performs as a shell extraction groove allowing the cannon ram loader or extraction device a detent to grasp as the expended shell case is ejected or ram loaded. FIG. 1 is included for purpose of understanding only. The ammunition and associated cannon are not considered part of Applicant's invention. It should also be understood that Applicant's invention is not limited to the 75 mm but may be practiced with various calibre ammunition.

Figure 2:
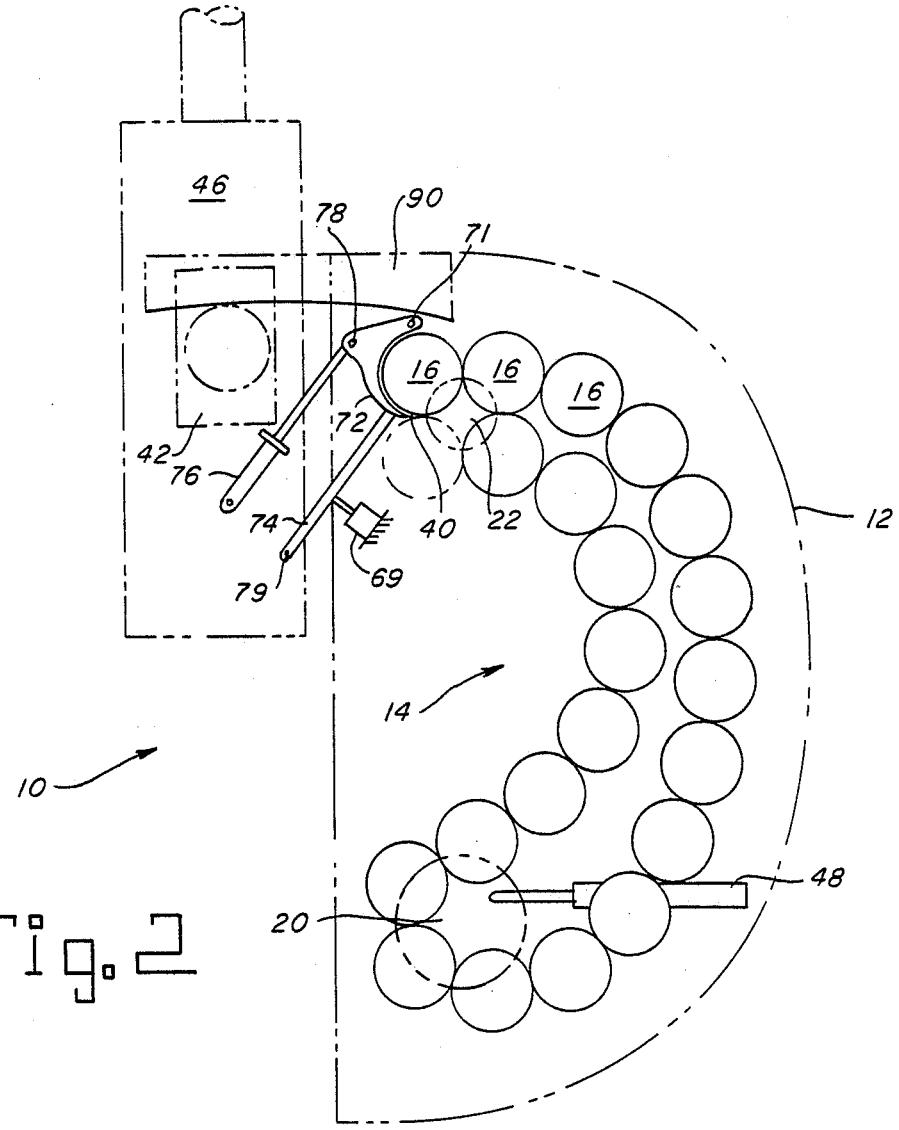
FIG. 2 is a cut-away view showing the conveyer system of the present invention within a magazine attached to a cannon.

Turning now to FIG. 2, the shell feeder of the present invention is designated number 10. Shell feeder 10 is depicted in FIG. 2 in operative relationship with a cannon 46 ready to receive rounds 16 in a revolving chamber 42. A shell magazine housing 12, dimensioned to hold a relatively large number of cannon shells, is shown with an ammunition conveyor belt 14 containing a plurality of cannon rounds 16. Whenever a round 16 is stripped from the conveyor belt, it is designated as 16′ throughout the drawings. In the embodiment chosen for illustration in FIG. 2, the conveyor belt is configured to hold 21 rounds, but it is to be understood that the present invention can be designed to hold any number of rounds within magazine housing 12. Conveyor belt 14 is a continuous loop, nondisintegrating, link-belt conveyor. (See FIG. 3). Conveyor belt 14 is indexed by a hydraulic actuator 48 driving a ratchet and prawl mechanism (FIG. 6) or a geneva gear train to position rounds 16, one at a time, to position 40, where a shell scoop 72 can grasp the round. Shell transfer arm 74, moving in parallel with hydraulic transfer cylinder 76, transfers rounds 16, one shell at a time, to an associated (but not shown) shell loader or rammer that then rams the ammunition 16′ in chamber 42 of cannon 46.

The reader should understand that one embodiment of Applicant's invention feeds a cannon 46 from the bottom by ramming rounds 16 straight up into revolving chamber 42 which then rotates the loaded round 16′ 90 degrees into horizontal alignment with the cannon barrel. This allows rounds 16 to be stored within belt 14 in an upright position.

Conveyor belt 14 moves as an endless track driven by a belt drive sprocket 20, which is advanced by hydraulic actuator 48, working through a ratchet and prawl mechanism or a geneva gear to advance belt 14 one shell at a time to shell extraction point 40. An idler sprocket wheel 22 guides belt 14 through a small radius turn which causes link belt 14 to open sufficiently to permit the shell, now in extraction position 40, to be sidewardly extracted therefrom by scoop 72. It is necessary to note that the path of belt 14 only loops back on itself enough to release entrained rounds 16 at point 40 in the embodiment chosen for illustration. Point 40 in this embodiment is also the position where new rounds may be loaded in belt 14. A mechanical latch, of a type known to those skilled in the weapons art but not illustrated may be included to hold ammunition within belt 14 at position 40 during functions such as reloading when it is not desired to extract rounds. Scoop 72 may urgingly release the mechanical latch as it moves into position to extract a round 16 from extraction point 40 on belt 14. The conveyor belt 14 may be designed to run in any pattern or track desired, as long as the belt 14 only loops back on itself, creating a radius small enough to release shells, at a point where shell extraction or loading is desired. The embodiment illustrated in FIG. 2 uses point 40 as both an extraction point and an ammunition load point. It should be understood that Applicant's invention may be practiced with a second point whereat belt 14 loops back on itself thus allowing ammunition to be loaded at a point separate from extraction point 40. This could be accomplished by making drive sprocket 20 with a smaller radius.

Figure 3:
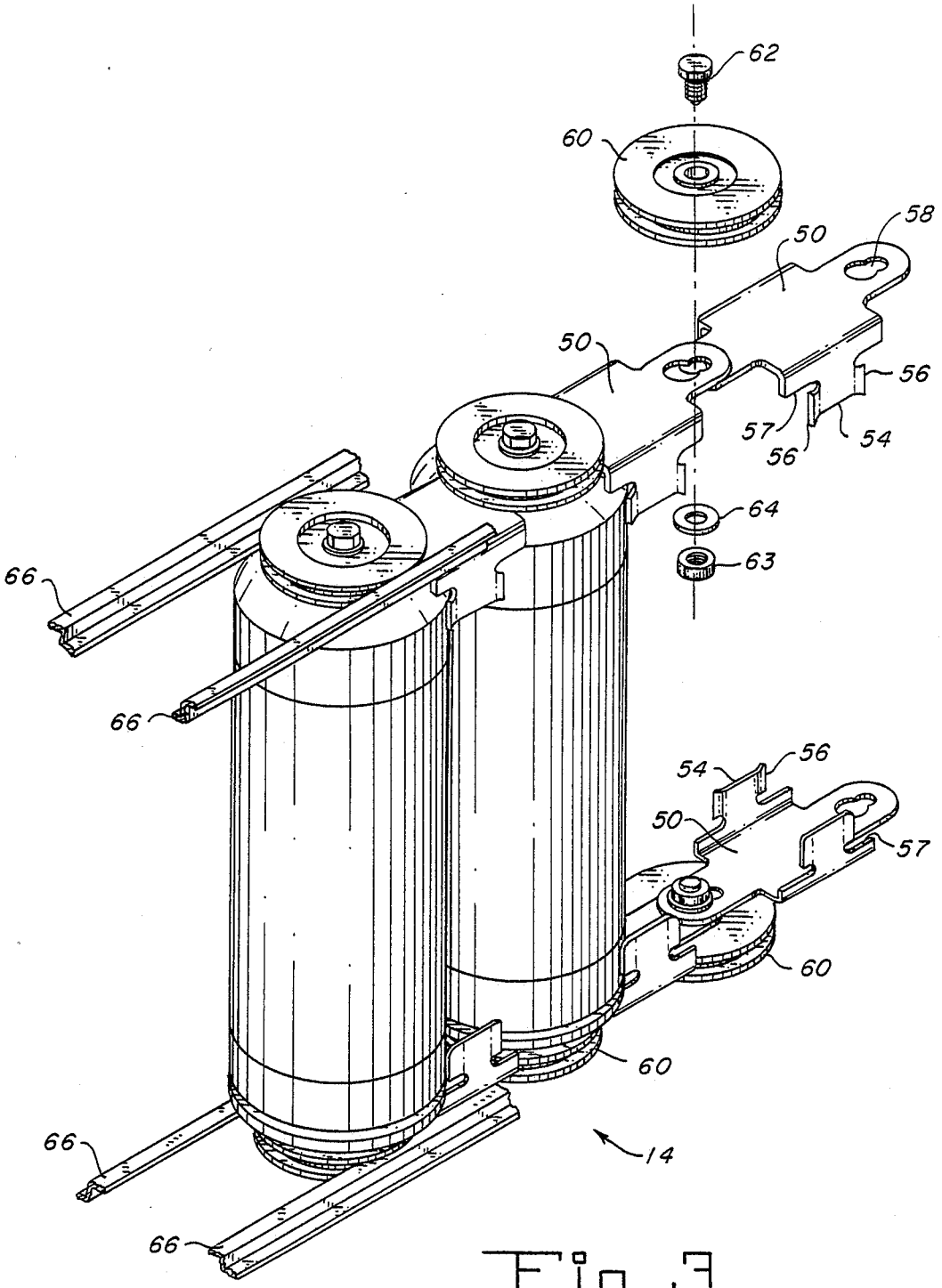
FIG. 3 is a partially expanded parts view of the nondisintegrating links, idler wheels and guide rails forming the conveyor system of the present invention.

Belt 14 may be further guided within magazine housing 12 by rails to conform to a desired track within the magazine. A reverse "C" configuration is chosen for illustration in FIG. 2 and the precise path is maintained by rails attached to the magazine housing 12, as seen in FIG. 3. The rails 66 are in identical pairs mounted to provide upper and lower support for belt 14. The rails 66 may be affixed by adhesive, welding, bolts, screws or other fastener means.

Continuing with FIG. 3, a more comprehensive understanding of the construction of belt 14 may be facilitated. Conveyor belt 14 is comprised of a number of upper and lower links 50. Each link has a pair of identical ears 54 protruding in parallel on either side of upper and lower links 50. The ears protrude normal to the plane of links 50 in a manner whereby the lower ears extend upward toward the downwardly extending ears on the upper links 50. Upper ears and lower ears 54 are identical in construction and each pair is arcuate in shape with sides curving outward from the center of links 50 at points 56. A base wider than ears 54 extends axially along belt 14 on either side of links 50, designated 57 in the drawings. The base points 57 are lips which extend radially inward on either end of rounds 16 when links 50 are joined to form belt 14. The ammunition 16 rests on the base points of the lower links in belts carrying ammunition in an upright position.

A further examination of FIG. 3 illustrates that upper and lower links 50 are joined respectively to other upper and lower links pivotally by bolts or trunion pins running through attachment holes 58 located on either end axially of links 50. Holes 58 may be elongated to facilitate pivoting of the links. The same bolts or trunion pins connecting a series of upper links or lower links 50 attach belt guide idler wheels designated 60 as seen in FIG. 3. The embodiment chosen for illustration in FIG. 3 attaches idler wheels 60 and joins adjacent upper and lower links 50 with a bolt 62 threadably engaging a nut 63. A washer 64 may be used. Each link overlaps axially the link on either end so that overlapping attachment holes 58 may take a single bolt 62 and pivotally attach one link to another.

Idler wheels 60 then are entrained within the upper and lower guide rails 66. The rails are rigidly affixed to the inner surface of magazine housing 12 to guide the conveyor belt on a predetermined course within the magazine.

It can be further seen from an examination of FIG. 2 and FIG. 3 that when belt 14 loops back on itself as it is guided around idler sprocket 22, the links pivot and the ears 54 move apart from the ears of links pivotally attached to adjacent links on belt 14, allowing entrained ammunition to be side stripped at point 40. The width of link ears 54, measured axially in relation to the diameter of shells 16. The radius of curvature of the belt 14 over idler sprocket wheel 22 are dimensioned such that at the location of maximum curvature, shells 16 can be extracted by scoop 72 or inserted inwardly into the belt for loading purposes. That is, when the links loop back on adjacent links the ears separate and release the round from the belt 14.

An optional mechanical latch (not shown) may be installed to hold ammunition in the belt while adjacent link ears are open. In this unillustrated embodiment, scoop 72 would urgingly release the latch as scoop 72 entrained a round 16 to be extracted. In the load mode the latch could be manually operated to first allow the round into position between the links and then to engage the round and hold it until the links pivot towards axial alignment thus entraining the newly loaded round.

In the embodiment chosen for illustration in the drawings, drive wheel 20 is constructed larger than idler wheel 22 so that only the latter allows the belt to loop back on itself to the degree necessary to free a round from the confines of the belt. It is considered within applicant's invention to design the drive wheel smaller and allow a second ammunition release point where ammunition can be loaded or unloaded from the belt.

Figure 4:
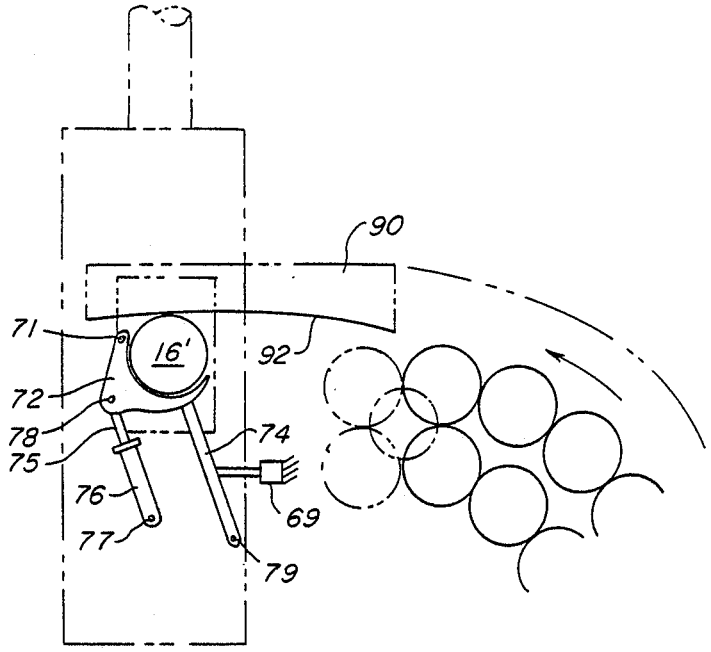
FIG. 4 is a partial view showing the shell feeder of FIG. 3 delivering a shell stripped from the conveyor belt to the cannon's ram-load position.

The operation of the present invention in transferring ammunition 16 from belt 14 may be best understood by turning to FIG. 4 wherein a round 16' has been side striped from the conveyor belt 14 and is shown in the position where a ram loader, (not shown), may ram the round into a cannon. The transfer operation is performed by a shell scoop 72, a transfer arm 74 and a hydraulic transfer cylinder 76.

Figure 7:
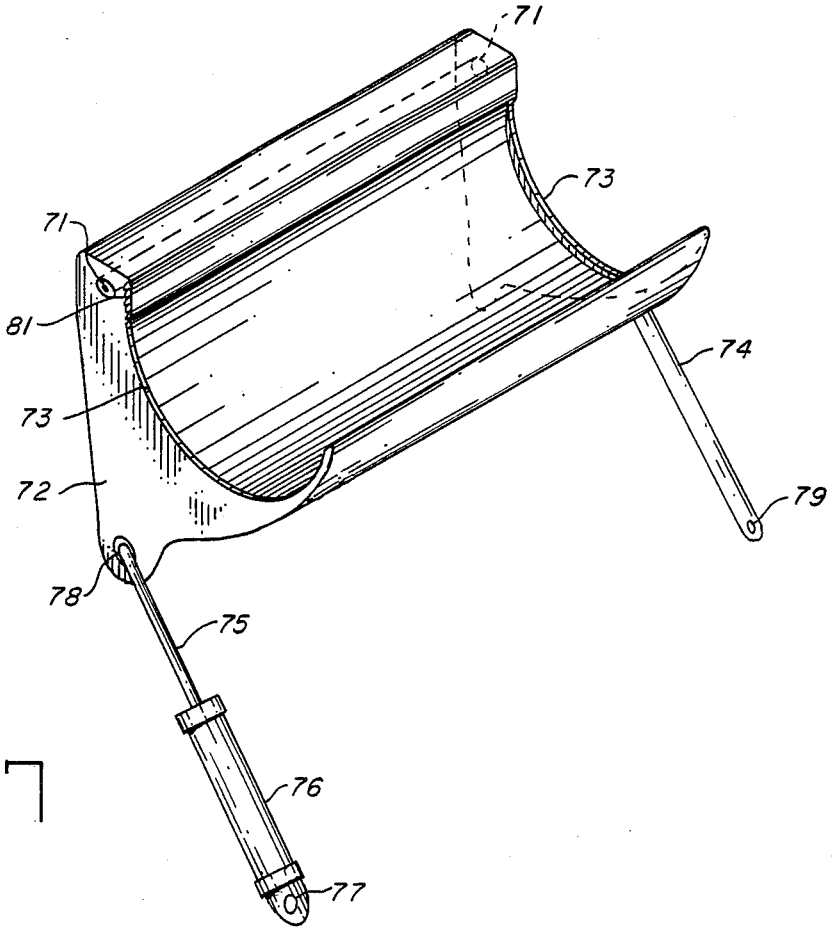
FIG. 7 is an oblique view of the ammunition scoop of the present invention.

Hydraulic transfer cylinder 76 is pivotally attached to the gun mount at point 77 and pivotally attached at point 78 to scoop 72, as best seen in FIG. 7. The attachment of transfer cylinder to scoop 72 and to the gun mount may be made by bolts, trunion pins, or any other means of pivotally attaching the cylinder. Scoop 72 is also pivotally attached to the archial end of transfer arm 74 at point 71. This attaches transfer arm 74 to the opposite end of scoop 72 in relation to the attachment point 78 of cylinder arm 75. Point 71 in FIG. 2 is an attachment hole running through scoop 72 where arm 74 attaches on the opposite side from the attachment 78 of cylinder 76.

The shell transfer arm 74 is likewise pivotally mounted on the gun mount at point 79 as well as pivotally to the scoop at point 71. Transfer arm 74 extends parallel with transfer cylinder 76 then circularly to pivot point 71 on scoop 72. The construction of arm 74 may best be seen in FIG. 5 wherein parts and illustrated apart. Transfer cylinder 76 and transfer arm 74 are operatively spaced so that they move in parallel. Cylinder 76 and transfer arm 74 remain in parallel regardless of the degree of extension of cylinder piston arm 75.

The ammunition feed cycle starts with the transfer arm 74 at the ram load position 42 with no round in scoop 72. Hydraulic transfer cylinder 76 is parallel with the transfer cylinder piston arm fully retracted. Conveyor belt 14 is then advanced to index a round 16 to the shell extraction point 40. It is worthy to note that many different types of ammunition can be entrained within belt 14, e.g., Hi-Frag, antipersonnel rounds, armor piercing and/or various other types. The gun crew would then advance the conveyor belt until a proper type round is indexed into the shell extraction point 40 before beginning automatic feeding.

Figure 5:
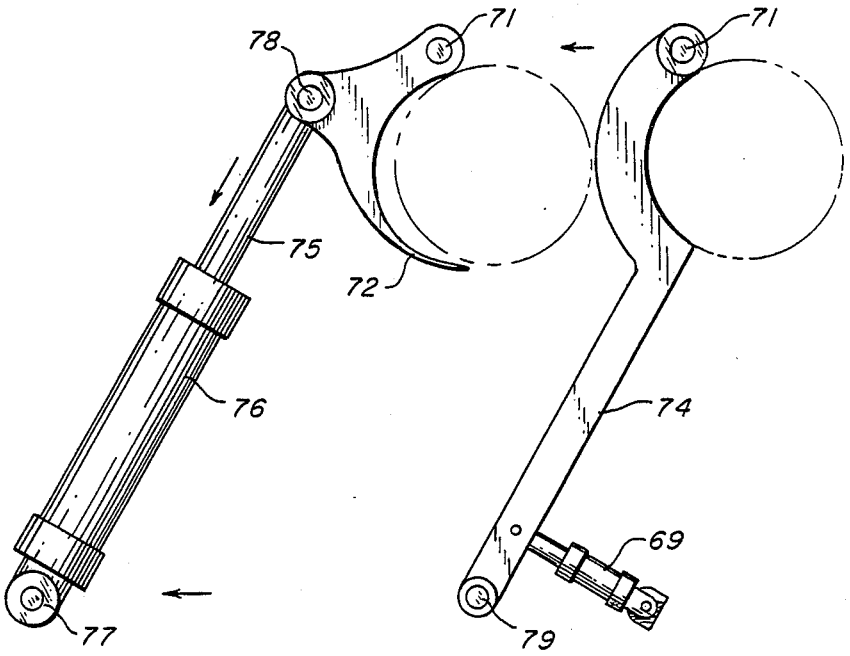
FIG. 5 is a separated detached view of the transfer arm assembly of the shell feeder of FIG. 4 drawn apart to show physical construction.

Turning to FIG. 5, where cylinder 76 and arm 74 are illustrated apart to show parts placement, the transfer operation is explained. The cycle starts with the transfer cylinder piston arm 75 beginning to extend. The motion causes shell scoop 72 to rotate around the round by pivoting in relation to arm 74 at point 71, thus rotating open. The initial motion of hydraulic transfer arm 74 is resisted by hydraulic damper 69. This initial resistance insures that scoop 72 rotates open with the start of the cycle. Continued extension of the transfer cylinder piston arm results in hydraulic transfer cylinder 76 and transfer arm 74 rotating around their lower pivot points 77 and 79. Both the transfer cylinder 76 and transfer arm 74 move in parallel and when the transfer cylinder piston arm 75 is fully extended, scoop 72 is open and loosely encircles the round indexed to shell extraction point 40.

Next, the transfer cylinder arm 75 begins to retract. Again, transfer arm 74 initial motion is resisted by hydraulic damper 69, resulting in scoop 72 rotating tightly around the round 16. Once the scoop is closed, the hydraulic pressure in cylinder 76 increases until the retarding force offered by hydraulic damper 69 is overcome. Transfer arm 74 now rotates around pivot point 77 moving round 16, now stripped from belt 14 and redesignated 16', toward ram load position 42. As round 16' is moved by scoop 72, the round is urgingly guided by shell guiding plate 92 of guide plate 90 illustrated in FIG. 4. Once scoop 72 has delivered round 16' to position 42, where a ram loader may engage and load, the hydraulic cylinder 76 extends arm 75 releasing scoop 72 from round 17' to free it for loading. Once loaded, arm 75 continues to extend beginning a new cycle.

Pivot point 79 is located equidistant from the centers of shell extraction position 40 and revolving chamber 42. Pivot point 77 is located relative to point 79 such that extension of cylinder piston 75 from its maximum retracted position to its extended position causes shell scoop 72 to move in on shell extractor position 40. Because transfer arm 74 is pivotally mounted at point 79 equidistance between the ram load and extraction points, scoop 72 rotates around a round 16 to be extracted at point 40. Retraction of the transfer cylinder piston 75 causes the shell scoop to move back to ram position 42. The actuation of transfer cylinder 76 thus moves shell scoop 72 back and forth between shell transfer position 40 and shell ram position 42. During the transfer operation the transferring round is urged against a guiding surface 92 on a shell guiding plate 90 (FIG. 2) which is affixed to the gun mount. As the transfer mechanism moves rounds from the extraction point to the ram load position, the shell guiding plate ensures the round is firmly within scoop 72 and prevents a round from moving out of scoop 72 during the transfer operation.

Turning now to FIG. 7, the construction of one embodiment of scoop 72 can be more fully understood. Scoop 72 is sized according to the calibre of ammunition and in the case of the 75 mm telescopic round shown in FIG. 1, scoop 72 is 18 inches wide. An upwardly protruding lip is located on either side of the scoop at points 73. These lips are approximately ¼ inch in height and ⅛ inch wide. In one embodiment lips 73 are operatively sized to enter containment grooves C and C′, shown on the ammunition in FIG. 1. Therefore, in the embodiment chosen for illustration, the lips are 18 inches center to center to correspond with 75 mm ammunition. An alternative design might have lips 73 farther apart where they can completely encircle a round 16 with the round completely within the breadth of the scoop between lips 73.

The scoop may have a protruding thumb 81 on the upper rear of the archial surface of scoop 72. The size of scoop 72 is such that when it is in position around a shell, the scoop extends slightly more than 180° around the circumference of the round.

The optional thumb 81 on scoop 72 provides a purchase on round 16′ during the transfer operation. The torque generated as the scoop is rotated around point 71 and moved between position 40 and position 42 causes scoop 72 to grasp the round more firmly. As the cyclic rate of fire is increased so is the torque. Thus this shell feeder has the capability to move vertically entrained rounds to a position below a cannon for ram loading up into revolving chamber 42. Scoop lips 73 are engaged with containment grooves C and C′ in the preferred embodiment and the round is frictionally pressed against shell guiding plate 90 on the gun mount during the transfer movement thus maintaining positive control of the round during transfer.

In operation, a shell 16 is picked up from transfer position 40 by scoop 72 as shown in FIG. 4. The shell 16 is extracted by scoop 72 from now immobile conveyor belt 14. As the extracted round is being transferred to ram position 42, hydraulic cylinder 48 (FIG. 2) begins rotating drive sprocket 20 to move conveyor belt 14 so as to index a next round 16 into transfer position 40. After the extracted shell has been ram loaded into the gun, transfer cylinder 76 is actuated to move shell scoop 72 back to extraction position 40 to pick up another round.

Figure 6:
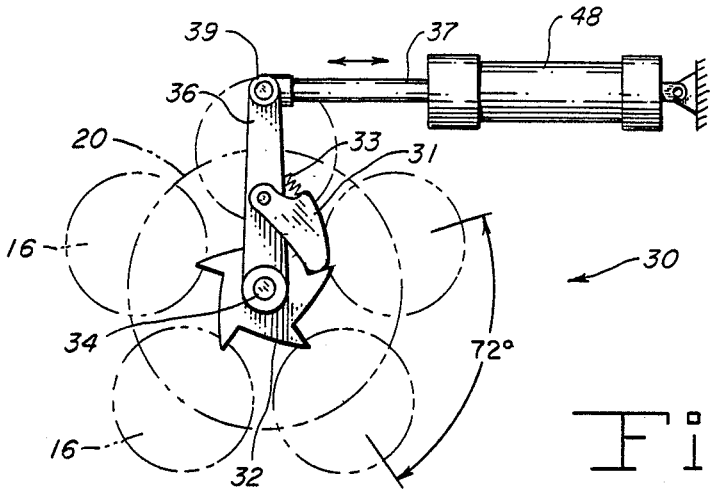
FIG. 6 is a plane view of one embodiment of a shell indexing mechanism.

One possible mechanism to index conveyor belt 14 by moving drive sprocket 20 in incremental steps may be understood by turning to FIG. 6 wherein the drive mechanism is generally designated 30. A ratchet ring 32 is mounted with an axle pin 34 extending through the center of drive wheel 20, thus centering the ratchet ring on the drive wheel. A ratchet arm 36 is pivotally attached at 39 to piston arm 37 of drive cylinder 48. A prawl 31 is pivotally mounted to ratchet arm 36 and biased with a spring 33 to move ratchet ring 32 one position with each stroke (out and back) of drive cylinder piston arm 37. It should be understood that the drive mechanism illustrated in FIG. 5 is only one of many possible indexing mechanisms. Others, such as a geneva drive, may be employed as a design choice.

It is interesting to note that as transfer cylinder 76 moves scoop 72 into ram load position 42 and comes to a stop, the torque on scoop 72 also ceases. This action coupled with the momentum of the recently transferred rounds frees the scoop engagement lips 73 from the ammunition containment grooves C and C′ allowing the round to settle onto the ram loader completely free of scoop 72.

Obviously, many modifications and variations of the present invention are possible in light of the above teachings. It is therefore to be understood that, within the scope of the appended claims, the invention may be practiced otherwise than as specifically described.

What is claimed is:

1. A shell feeder for telescoped ammunition comprising:

a magazine housing;

a plurality of linking means forming a conveyor belt for carrying the ammunition within said housing;

a scoop for grasping the ammunition from said conveyor belt at a preselected point; and transfer means for transferring the ammunition from said preselected point to a position whereby a ram loader can load the ammunition into a cannon.

2. A shell feeder for telescoped ammunition according to claim 1 wherein said magazine housing contains guide rails for routing said conveyor belt on a predetermined path within said housing.

3. A shell feeder for telescoped ammunition according to claim 2, wherein said guide rails form a "reverse C" configuration with at least one position wherein said conveyor belt loops back on itself, thus separating said linking means at said preselected point whereby the ammunition can be sidestripped by said scoop.

4. A shell feeder according to claim 1 wherein said transfer means is a transfer arm and a hydraulic actuating cylinder pivotally mounted to move in parallel, each connected to said scoop whereby actuating said hydraulic cylinder causes said scoop to move in and entrain the ammunition at said preselected point on said conveyor belt, transfer the ammunition and release it at a position where a ram loader can load it into a cannon.

5. A shell feeder according to claim 2 wherein said transfer means is a transfer arm and a hydraulic actuating cylinder pivotally mounted to move in parallel, each connected to said scoop whereby actuating said hydraulic cylinder causes said scoop to move in and entrain the ammunition at said preselected point on said conveyor belt, transfer the ammunition and release it at a position where a ram loader can load it into a cannon.

6. A shell feeder according to claim 3 wherein said transfer means is a transfer arm and a hydraulic actuating cylinder pivotally mounted to move in parallel, each connected to said scoop whereby actuating said hydraulic cylinder causes said scoop to move in and entrain the ammunition at said preselected point on said conveyor belt, transfer the ammunition and release it at a position where a ram loader can load it into a cannon.

7. A shell feeder for telescoped ammunition according to claim 1 wherein said plurality of linking means comprises an endless series of upper and lower links connected to other upper and lower links respectively by pivot pins, said pivot pins additionally affixing upper and lower belt guide wheels to ride in and correspond with said guide rails.

8. A shell feeder according to claim 4 wherein said plurality of linking means comprises an endless series of upper and lower links connected to other upper and lower links respectively by pivot pins, said pivot pins additionally affixing upper and lower belt guide wheels to ride in and correspond with said guide rails.

9. A shell feeder according to claim 6 wherein said plurality of linking means comprises an endless series of upper and lower links connected to other upper and lower links respectively by pivot pins, said pivot pins additionally affixing upper and lower belt guide wheels to ride in and correspond with said guide rails.

10. A shell feeder for telescoped ammunition according to claim 1 further comprising a shell guide plate whereby the ammunition is urgingly held within said scoop during transfer operation.

11. A shell feeder for telescoped ammunition according to claim 4 further comprising a shell guide plate whereby the ammunition is urgingly held within said scoop during transfer operation.

12. A shell feeder for telescoped ammunition according to claim 7 whereby the ammunition is urgingly held within said scoop during transfer operation.

13. A shell feeder for telescoped ammunition comprising:

a magazine housing;

a conveyor belt comprising a plurality of linking means forming an endless series of upper and lower links connected respectively to other upper and lower links by pivot pins which also affix upper and lower belt guide wheels to ride in and correspond; with, guide rails mounted within said housing for routing said conveyor belt in a "reverse C" configuration whereby said conveyor belt loops back on itself thus separating said links at least one predetermined point whereat the ammunition may be side-stripped, a scoop for grasping and containing the ammunition at said predetermined point; and transfer means comprising a transfer arm and a hydraulic actuating cylinder pivotally mounted to move in parallel, each mounted to said scoop whereby actuating said hydraulic cylinder causes said scoop to move in and entrain the ammunition at said preselected point on said conveyor belt, transfer and ammunition in correspondence with said shell guiding plate and release it at a position where a ram loader can load it into a cannon.

14. A shell feeding system according to claim 1 wherein said transfer system actuates a "geneva" gear thus indexing said conveyor belt one shell position each cycle.

15. A shell feeding system according to claim 13 wherein said transfer system actuates a "geneva" gear thus indexing said conveyor belt one shell position each cycle.

* * * * *